(12) United States Patent
Massey, Jr.

(10) Patent No.: US 10,294,040 B2
(45) Date of Patent: May 21, 2019

(54) SPLIT FLUID JET HEAD AND MANIFOLD FOR RECEIPT OF SPLIT FLUID JET HEAD

(71) Applicant: George W. Massey, Jr., Edisto, SC (US)

(72) Inventor: George W. Massey, Jr., Edisto, SC (US)

( * ) Notice: Subject to any disclaimer, the term of this patent is extended or adjusted under 35 U.S.C. 154(b) by 0 days.

(21) Appl. No.: 16/019,597

(22) Filed: Jun. 27, 2018

(65) Prior Publication Data

US 2019/0023495 A1   Jan. 24, 2019

Related U.S. Application Data

(60) Provisional application No. 62/534,415, filed on Jul. 19, 2017.

(51) Int. Cl.
*B65G 45/22* (2006.01)
*B05B 1/14* (2006.01)
*B08B 3/02* (2006.01)

(52) U.S. Cl.
CPC .............. *B65G 45/22* (2013.01); *B05B 1/14* (2013.01); *B08B 3/022* (2013.01); *B08B 2203/02* (2013.01)

(58) Field of Classification Search
CPC ........ B65G 17/08; B65G 17/40; B65G 45/22; B08B 3/022; B08B 2203/02; B05B 1/14
USPC ......................................................... 198/495
See application file for complete search history.

(56) References Cited

U.S. PATENT DOCUMENTS

| | | | | | |
|---|---|---|---|---|---|
| 3,939,964 | A * | 2/1976 | Poerink | ........... | B65G 17/08 198/853 |
| 5,213,203 | A * | 5/1993 | Kinney | ........... | B65G 17/08 198/834 |
| 5,253,749 | A * | 10/1993 | Ensch | ........... | B65G 17/08 198/834 |
| 5,305,869 | A * | 4/1994 | Damkjaer | ........... | B65G 17/08 198/689.1 |
| 6,189,686 | B1 * | 2/2001 | Shibayama | ........... | B65G 17/08 198/493 |
| 7,364,036 | B2 * | 4/2008 | Schoepf | ........... | B65G 17/08 198/850 |
| 9,139,370 | B1 * | 9/2015 | Massey, Jr. | ........... | B65G 17/40 |
| 9,550,628 | B2 * | 1/2017 | Wunsch | ........... | B65G 17/08 |

* cited by examiner

*Primary Examiner* — Gene O Crawford
*Assistant Examiner* — Keith R Campbell
(74) *Attorney, Agent, or Firm* — Dority & Manning, P.A.

(57) ABSTRACT

Cleaning assemblies, particularly for conveyor systems, are provided. For example, a cleaning assembly comprises a split fluid jet head that includes an inlet end for receipt of a flow of a fluid, an outlet end for an egress of the fluid, and a plurality of veins extending from the inlet end to the outlet end. The plurality of veins split the flow of the fluid into a plurality of flows of the fluid. The cleaning assembly also comprises a manifold that includes a body and a plurality of fluid passages defined through the body. Each fluid passage has an inlet port and an outlet port. The outlet ports are defined at various locations along the body. The manifold is configured to receive the split fluid jet head such that each vein of the plurality of veins is aligned with an inlet port of the plurality of inlet ports.

19 Claims, 13 Drawing Sheets

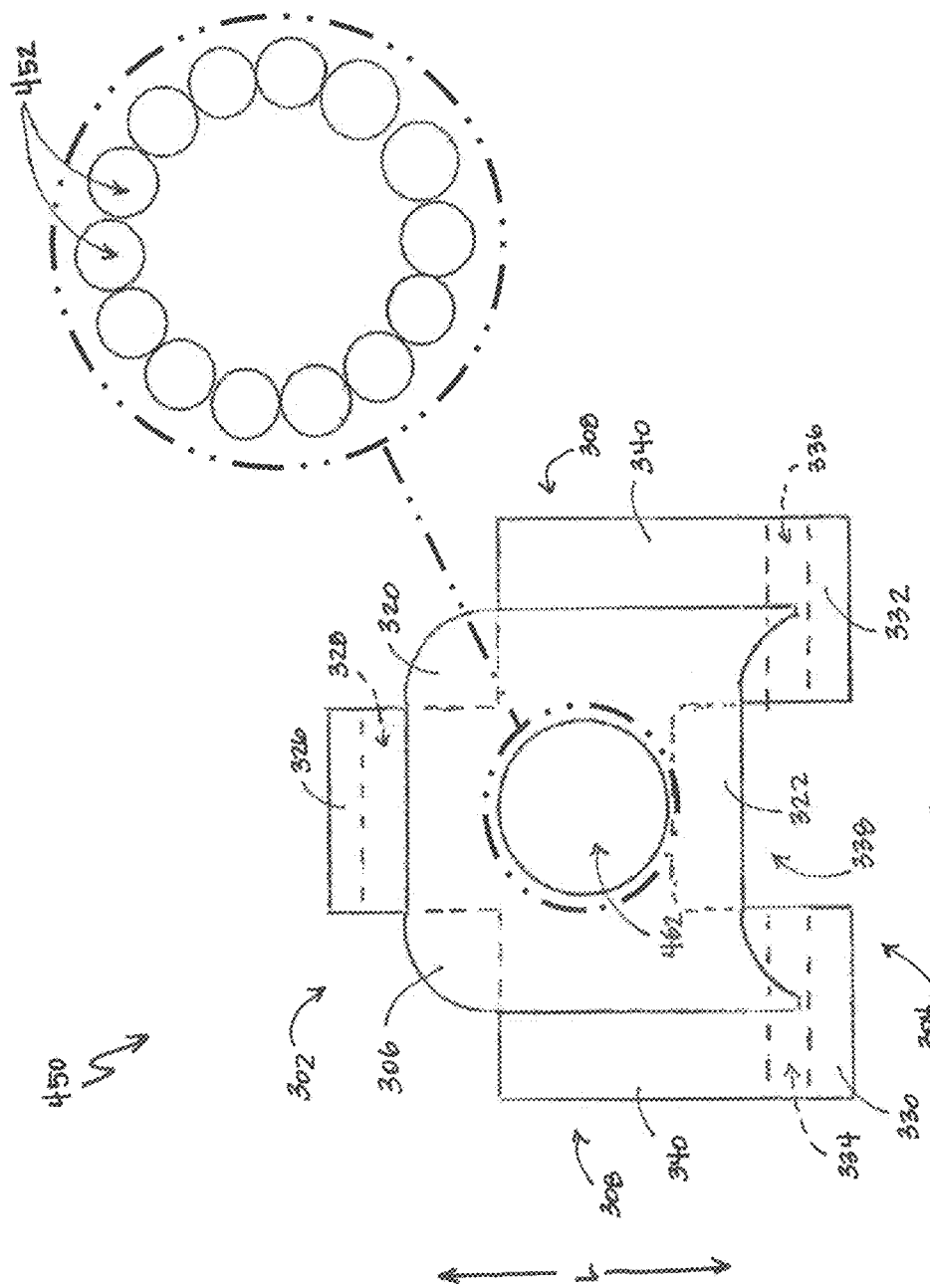

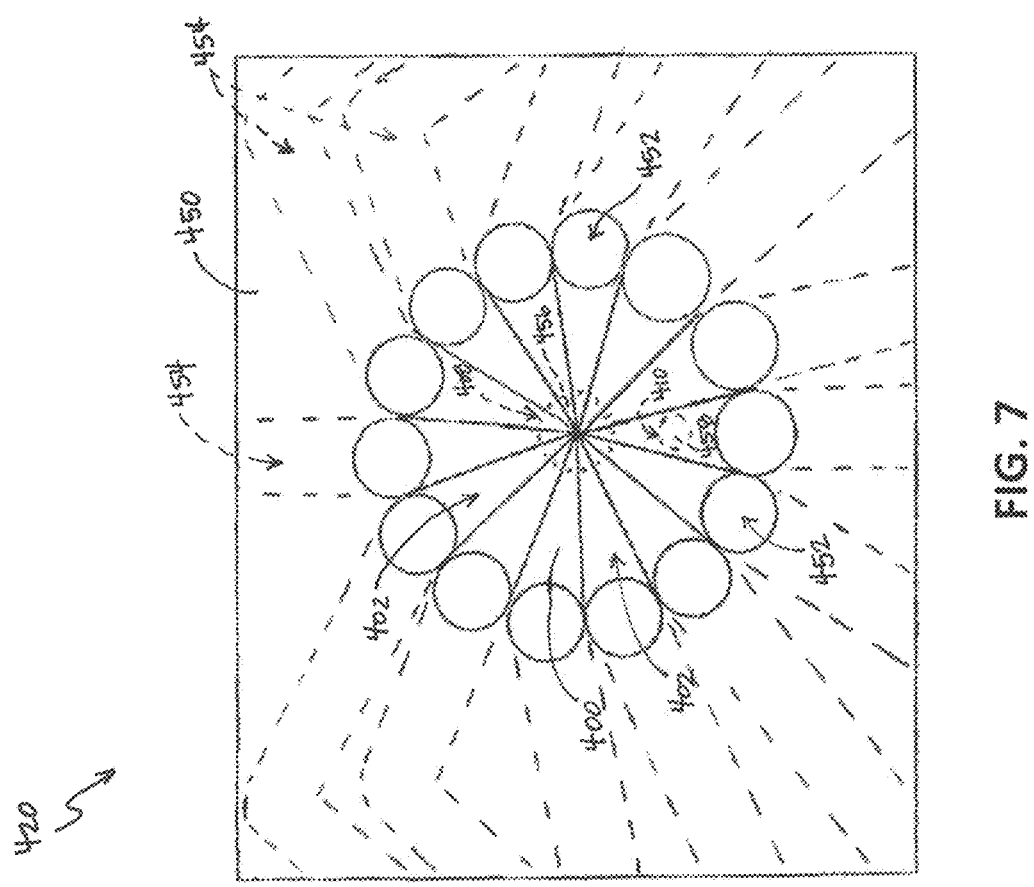

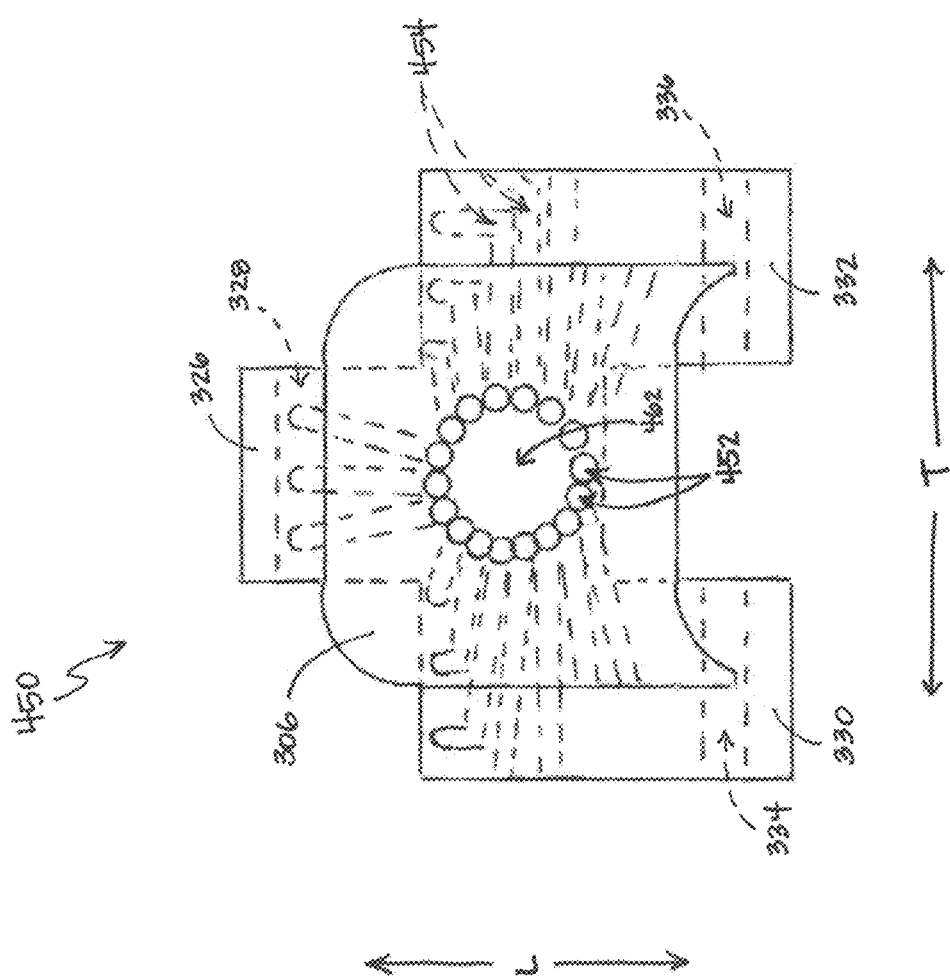

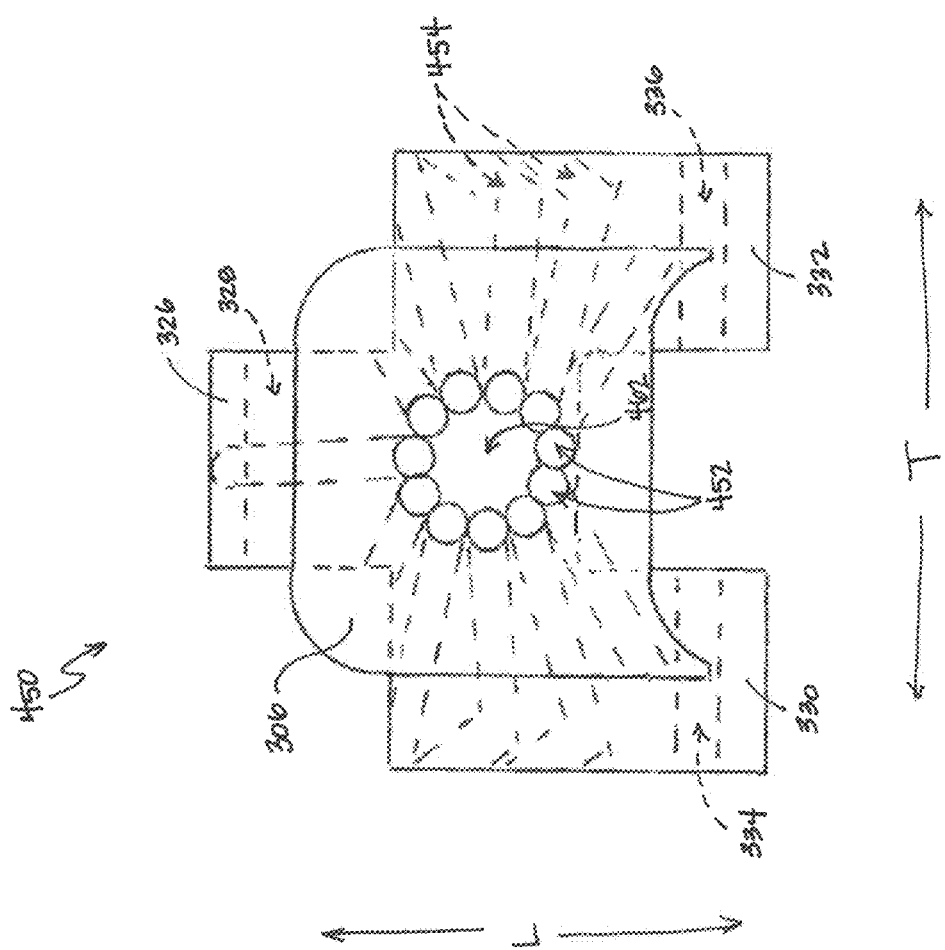

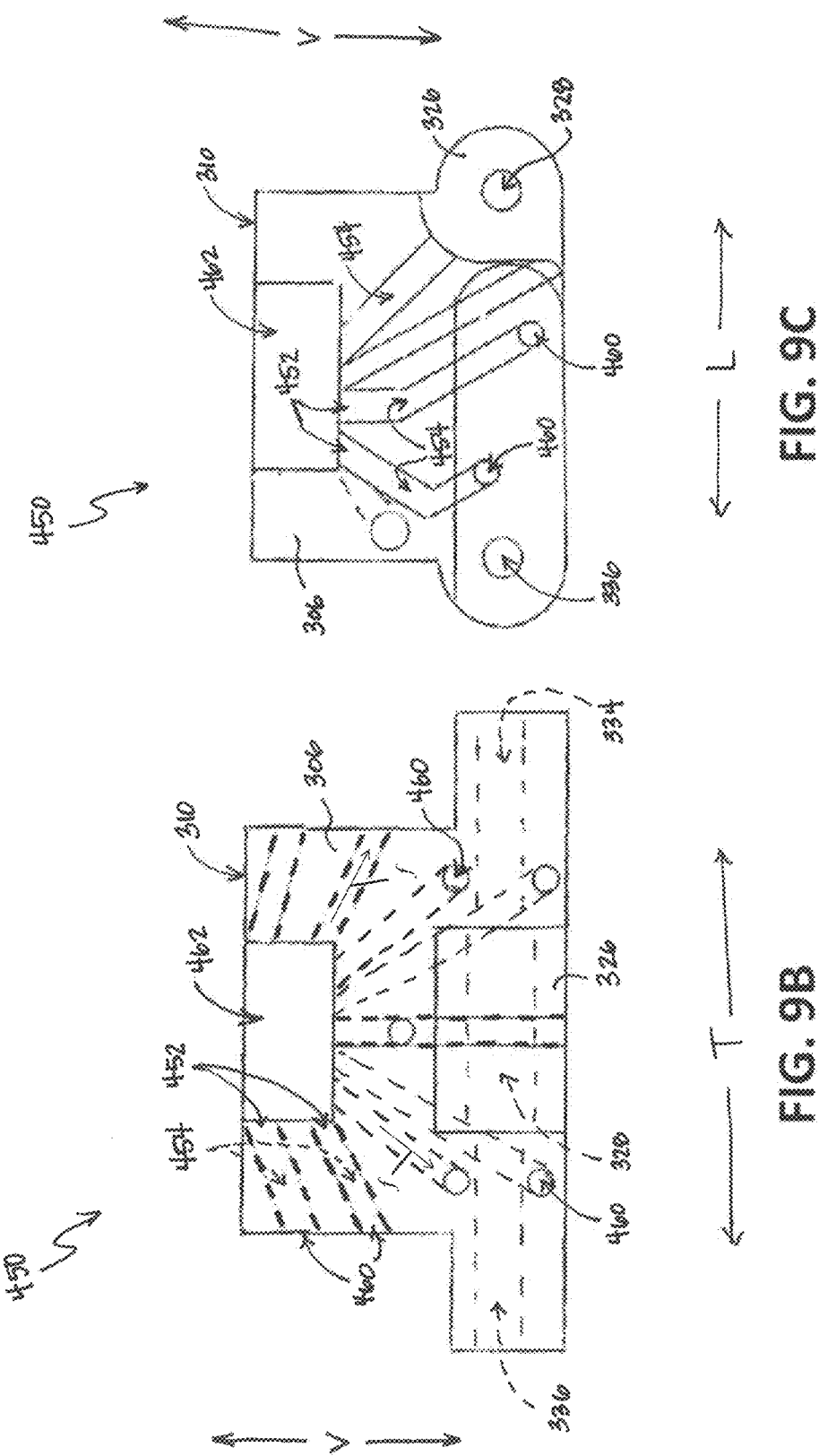

SPLIT FLUID JET HEAD AND MANIFOLD FOR RECEIPT OF SPLIT FLUID JET HEAD

CROSS-REFERENCE TO RELATED APPLICATIONS

The present application claims priority to U.S. Provisional Application Ser. No. 62/534,415, filed on Jul. 19, 2017, which is incorporated herein in its entirety by reference thereto.

FIELD

The present subject matter relates generally to a split fluid jet head and a manifold for receipt of fluid from the split fluid jet head. More particularly, the present subject matter relates to conveyor systems comprising at least one mechanical chain formed from a plurality of links and a split fluid jet head and manifold for cleaning such conveyor systems.

BACKGROUND

Conveyor systems generally include one or more belts or chains for conveying items along a path defined by the conveyor system. Such chains may include a plurality of links that, in turn, engage a sprocket to drive the conveyor. The chain conveyor systems may be used in a variety of environments for conveying many different types of items. For instance, the chain conveyor systems may be used in food processing facilities, package sorting and distribution facilities, warehouses for different materials and products, etc.

From time to time, the conveyor systems may require cleaning, e.g., due to the buildup of debris, a spill of a contaminant, or the like. In some instances, the debris or contaminants may be hard to remove from the conveyor system, particularly from an area between a chain of links and a track or profile in which the chain travels. For example, the debris or contaminants may be sticky, adhesive, or built up, or it may be difficult to access areas between the chain and track or profile where debris or contaminants accumulate.

Accordingly, a cleaning assembly for a conveyor system would be beneficial. In particular, a split fluid jet head for equalizing a pressure of a fluid between multiple ports of a manifold would be useful. A split fluid jet head that improves mixing of cleaning agents also would be helpful. Further, a manifold for distributing a cleaning fluid to multiple ports for cleaning different areas of a component would be desirable.

BRIEF DESCRIPTION

Aspects and advantages of the invention will be set forth in part in the following description, or may be obvious from the description, or may be learned through practice of the invention.

In one exemplary embodiment of the present subject matter, a cleaning assembly is provided. The cleaning assembly comprises a manifold including a body and a plurality of fluid passages defined through the body. Each fluid passage has an inlet port and an outlet port such that the manifold has a plurality of inlet ports and a plurality of outlet ports. The plurality of outlet ports are defined at various locations along the body. The manifold is configured in the shape of one of a plurality of links of a mechanical chain and is assembled with the plurality of links to form the mechanical chain.

In another exemplary embodiment of the present subject matter, a cleaning assembly for a conveyor system having a mechanical chain for conveying items thereon is provided. The cleaning assembly comprises a split fluid jet head including an inlet end for receipt of a flow of a fluid, an outlet end for an egress of the fluid, and a plurality of veins extending from the inlet end to the outlet end. The plurality of veins split the flow of the fluid into a plurality of flows of the fluid. The cleaning assembly also comprises a manifold for receipt of the split fluid jet head. The manifold includes a body and a plurality of fluid passages defined through the body. Each fluid passage has an inlet port and an outlet port such that the manifold has a plurality of inlet ports and a plurality of outlet ports. The plurality of outlet ports are defined at various locations along the body. The manifold is configured to receive the split fluid jet head such that each vein of the plurality of veins is aligned with an inlet port of the plurality of inlet ports. The mechanical chain comprises a plurality of links and the manifold is configured in the shape of one of the plurality of links and is assembled with the plurality of links to form the mechanical chain.

In a further exemplary embodiment of the present subject matter, a conveyor system is provided. The conveyor system comprises at least one chain having a plurality of links and configured for conveying items thereon; an upper profile for receipt of a portion of the at least one chain; a lower profile for receipt of another portion of the at least one chain; a support structure for supporting the at least one chain, the upper profile, and the lower profile; and a cleaning assembly. The cleaning assembly includes a split fluid jet head that includes an inlet end for receipt of a flow of a fluid, an outlet end for an egress of the fluid, and a plurality of veins extending from the inlet end to the outlet end. The plurality of veins split the flow of the fluid into a plurality of flows of the fluid The cleaning assembly further includes a manifold for receipt of the split fluid jet head. The manifold includes a body and a plurality of fluid passages defined through the body. Each fluid passage has an inlet port and an outlet port such that the manifold has a plurality of inlet ports and a plurality of outlet ports, and the plurality of outlet ports are defined at various locations along the body. The manifold is configured to receive the split fluid jet head such that each vein of the plurality of veins is aligned with an inlet port of the plurality of inlet ports. The manifold is configured in the shape of one of the plurality of links and is assembled with the plurality of links to form the mechanical chain.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 provides a top view of a manifold, with an enlarged view of inlet ports of the manifold, according to an exemplary embodiment of the present subject matter.

FIG. 7 illustrates a portion of the manifold of FIG. 6 with veins of the split fluid jet head of FIGS. 5A, 5B, and 5C aligned with the manifold inlet ports and the split fluid jet head held in position with respect to the manifold.

FIG. 9A provides a top view, FIG. 9B provides a front view, and FIG. 9C provides a side view of a manifold having eleven (11) inlet ports according to an exemplary embodiment of the present subject matter.

DETAILED DESCRIPTION

Figure 1:
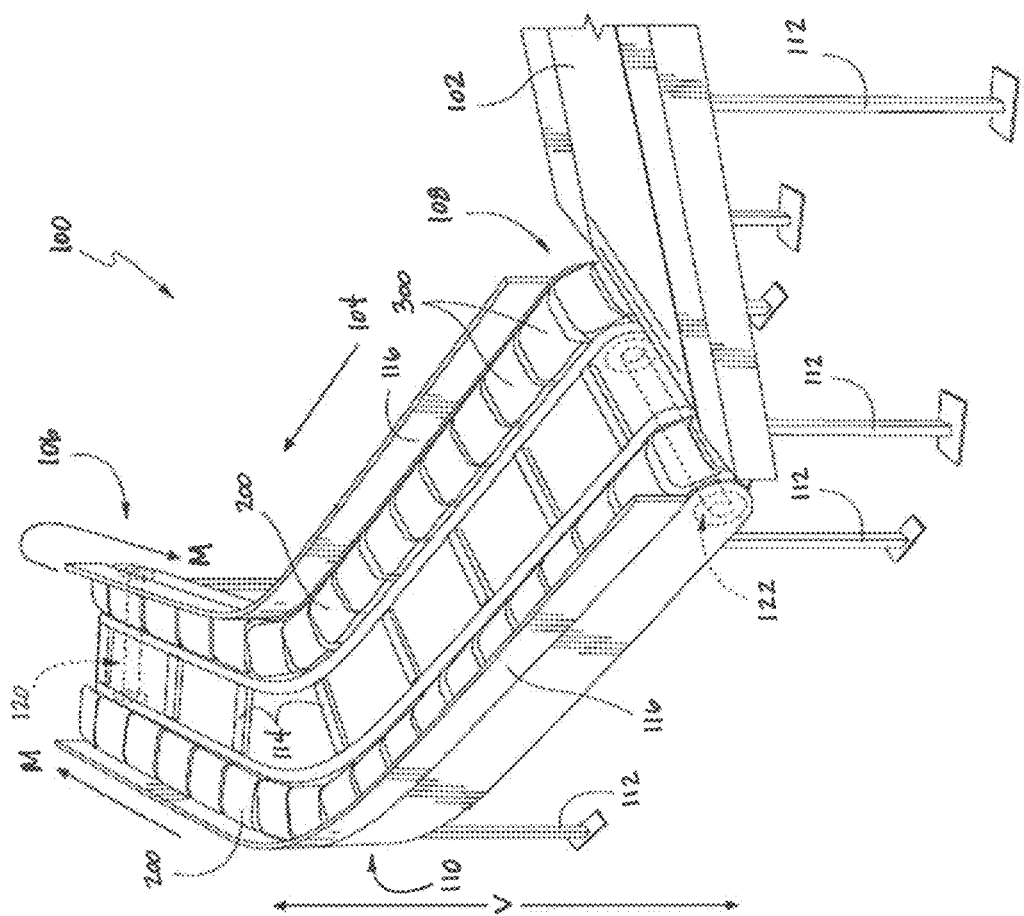
FIG. 1 provides a perspective view of a portion of a conveyor system according to an exemplary embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a perspective view of a portion of a conveyor system 100 according to an exemplary embodiment of the present subject matter. In the illustrated embodiment, two mechanical chains 200 are used to form a conveyor to convey thereon items such as, e.g., empty or loaded boxes or the like. Each chain is formed from a plurality of links 300 having a top surface (FIG. 3) on which the items to be conveyed are placed. As shown in FIG. 1, the two chains 200 are positioned equidistant from each other throughout conveyor system 100, i.e., in the exemplary embodiment, one chain 200 is parallel to the other chain 200 at any point within conveyor system 100. As will be readily understood, one, two, or more than two chains may be used to form a conveyor to convey items thereon. Additionally, when more than one chain 200 is used within conveyor system 100, the chains may or may not be parallel at every point within conveyor system 100. Chain 200 is described in greater detail below.

Within conveyor system 100, chains 200 are supported on a support structure 110 including a plurality of vertical supports 112 and a plurality of horizontal supports 114. As shown in FIG. 1, support structure 110 also may include one or more guide walls 116, e.g., to help guide items as they are conveyed by conveyor system 100. Additionally, other components such as, e.g., ramp or slide 102 may be used in conveyor system 100 to transfer items from one portion of system 100 to another portion.

As further illustrated in FIG. 1, chains 200 of conveyor system 100 are driven by a sprocket assembly 120 positioned at a drive end 106 of conveyor system 100, with an idler assembly 122 positioned at a return end 108 of system 100 to guide chains 200. Specifically, each chain 200 generally traverses a loop such that links 300 of chains 200 in the upper grouping of the loop are pulled by sprocket assembly 120 away from idler assembly 122 along a direction of movement M, with a portion of each chain 200 exposed for the placement of items thereon. Links 300 in the lower grouping of the loop are pushed toward idler assembly 122 in a direction opposite to the direction of movement M. Conveyor system 100 is described in greater detail below.

Figure 2:
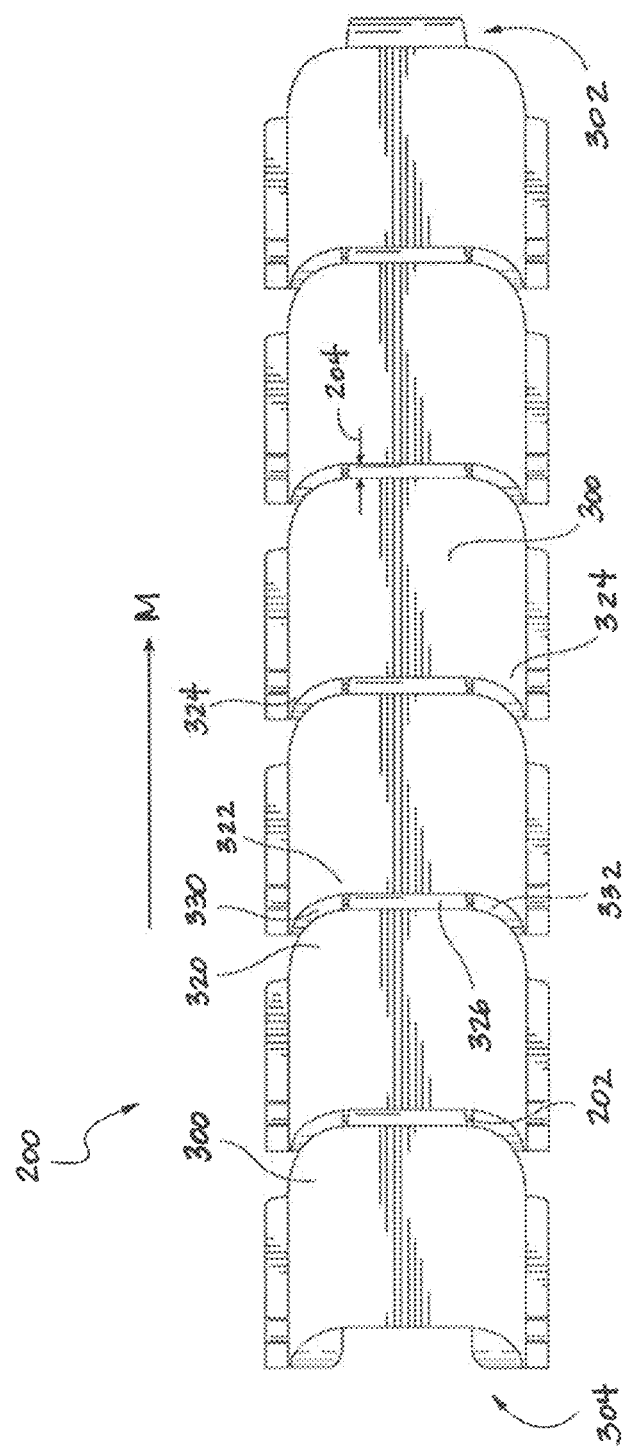
FIG. 2 provides a top view of a portion of a mechanical chain of the conveyor system of FIG. 1, according to an exemplary embodiment of the present subject matter.

FIG. 2 provides a top view of a portion of an exemplary mechanical chain 200 of the present subject matter. As shown, a plurality of links 300 are joined with a plurality of pins 202 to form chain 200. Each link 300 includes a leading end 302 and a trailing end 304 oriented along the direction of movement M, with leading end 302 of each link 300 traversing the path of chain 200 before trailing end 304. Additionally, each link 300 is shaped to complement each adjacent link 300, as further described below.

Figure 3:
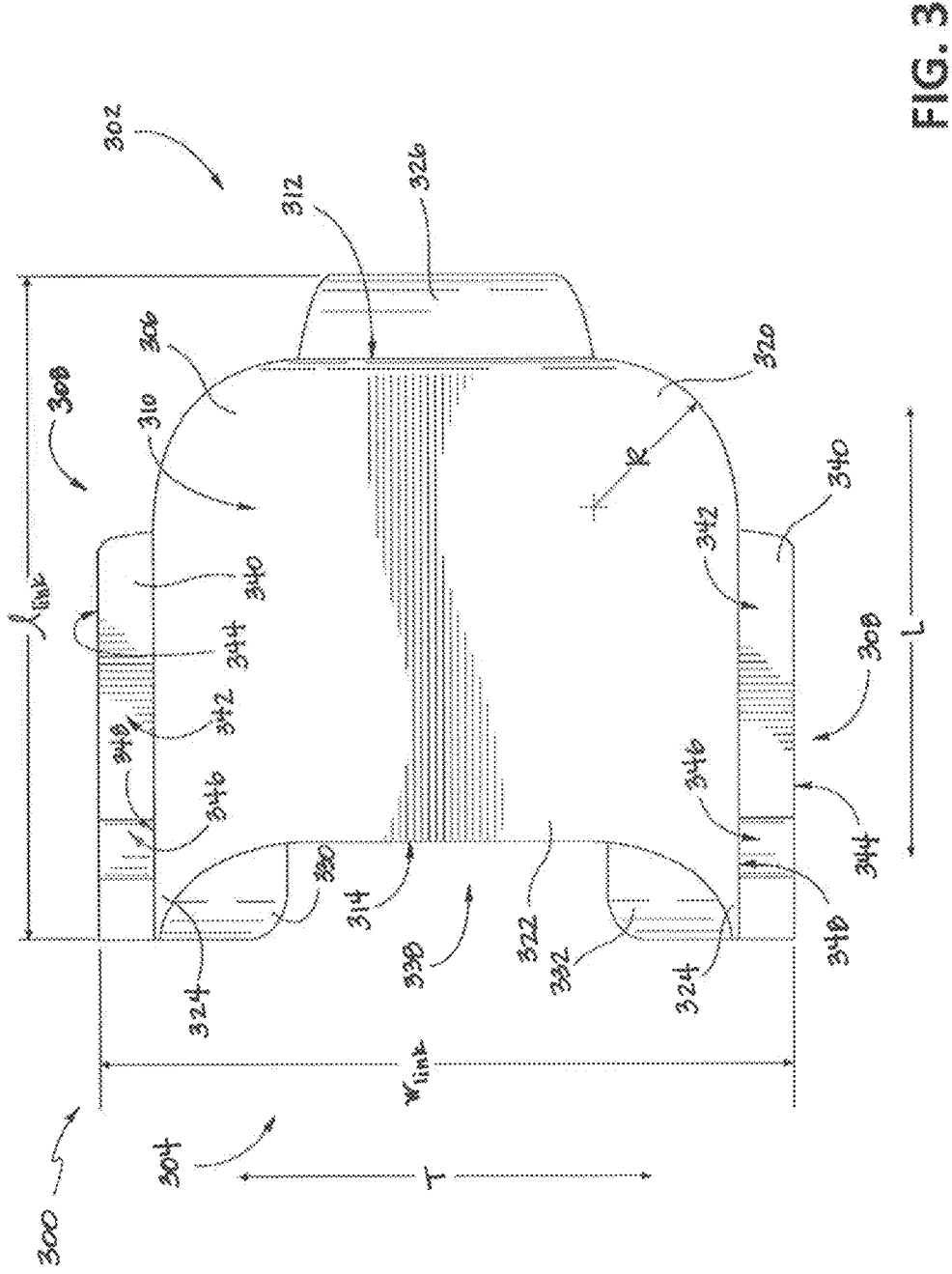
FIG. 3 provides a top view of a link of the mechanical chain of FIG. 2, according to an exemplary embodiment of the present subject matter.
Figure 4:
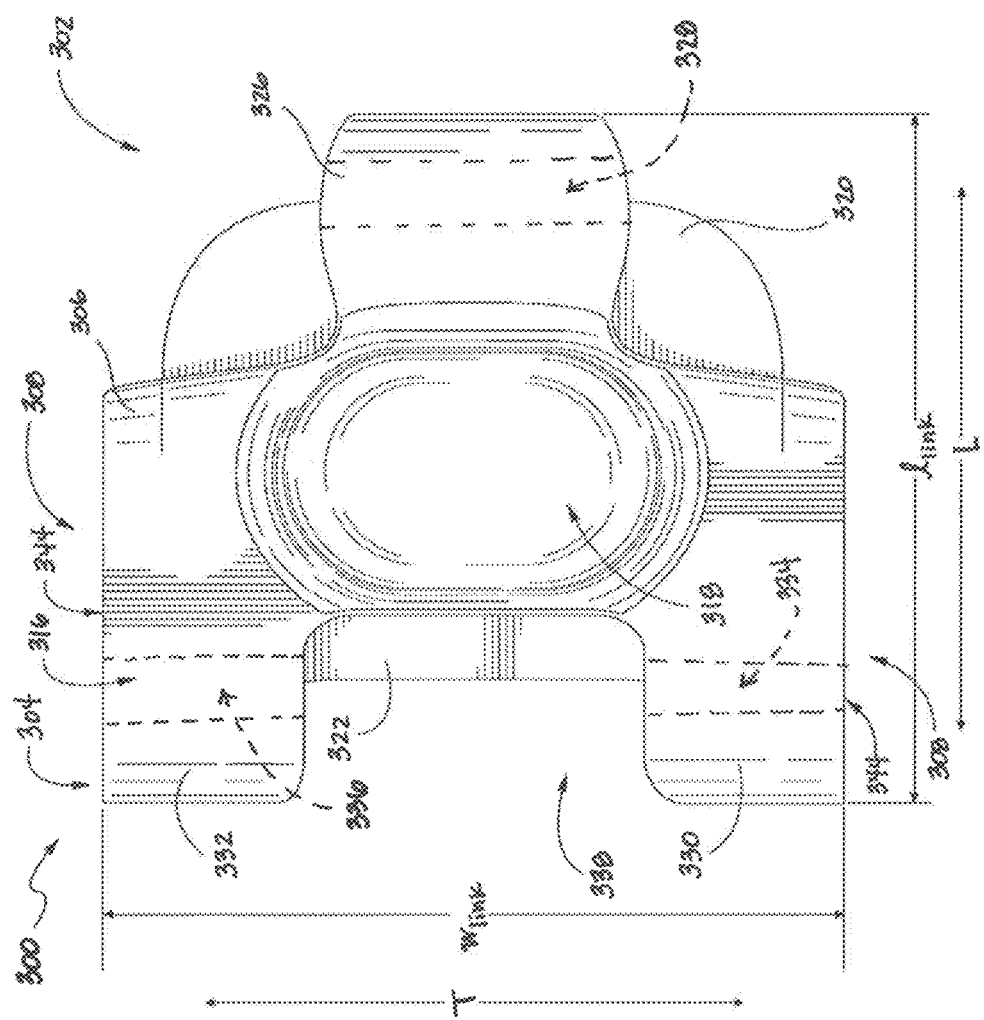
FIG. 4 provides a bottom view of the exemplary link of FIG. 3.

FIGS. 3 and 4 illustrate an exemplary link 300 of chain 200 of the present subject matter; FIG. 3 provides a top view and FIG. 4 provides a bottom view of the link 300. Referring to FIG. 3, link 300 has a body 306 extending in a longitudinal direction L between leading end 302 and a trailing end 304. Body 306 defines a pair of opposing sides 308. Each side 308 elongates or extends along the longitudinal direction L, and body 306 extends along a transverse direction T therebetween. The transverse direction T is orthogonal to the longitudinal direction L. Further, body 306 further includes a top surface 310 that extends uninterruptedly in the transverse direction T from one opposing side 308 of body 306 to the other opposing side 308 of body 306. Top surface 310 also extends uninterruptedly in the longitudinal direction L from a leading edge 312 to a trailing edge 314.

Referring now to FIG. 4, body 306 includes a bottom surface 316 extending transversely between the opposing sides 308 and longitudinally between leading end 302 and trailing end 304. Bottom surface 316 defines a recess 318 extending into body 306 in a vertical direction V (FIGS. 5A, 8B, 8C, 9B, 9C, 10) to a depth that is less than a height of the body 306. Recess 318 is configured in size and shape, e.g., for receipt of a sprocket tooth (not shown) of complementary size and shape, for example, as hand-in-glove. The vertical direction V is orthogonal to each of the longitudinal direction L and the transverse direction T.

Turning back to FIG. 3, the top surface 310 includes a male portion 320, which is disposed closer to leading end 302 than to trailing end 304. Male portion 320 has a generally rounded segment disposed toward each side 308. A top edge of each rounded segment has a radius of curvature R extending between a section that becomes tangent to the leading edge 312 of top surface 310 and a section that becomes tangent to the respective nearby side 308.

Top surface 310 further includes a female portion 322, which is disposed closer to trailing end 304 than to leading end 302 and is configured in size and shape to complement male portion 320. Female portion 322 defines a horn segment 324 disposed toward each opposite side 308 of body 306 such that there are two horn segments 324. As shown in FIG. 2, horn segments 324 generally define the shape of female portion 322 as a complement to the shape of male portion 320. As most clearly shown in FIG. 3, male portion 320 and female portion 322 are shaped or formed such that top surface 310 is generally D-shaped. However, top surface 310 may have other shapes and configurations as well.

Leading end 302 defines a male hinge element 326 that vertically is disposed between the top and bottom surfaces 310, 316 of body 306. Further, male hinge element 326 transversely is disposed between opposing sides 308. As shown in FIG. 4, male hinge element 326 defines an aperture 328 that extends through male hinge element in the transverse direction T.

Trailing end 304 defines a first female hinge element 330 disposed toward one side 308 of body 306 and a second female hinge element 332 disposed toward the opposite side 308 of body 306. First female hinge element 330 and second female hinge element 332 vertically are disposed between the top and bottom surfaces 310, 316 of body 306. The longitudinal distance between the leading edge of male hinge element 326 and the trailing edges of first and second female hinge elements 330, 332 defines a length $l_{link}$ of link 300.

As shown in FIG. 4, first female hinge element 330 defines an aperture 334 extending through hinge element 330 along the transverse direction T. Similarly, second female hinge element 332 defines an aperture 336 extending through hinge element 332 along the transverse direction T. Apertures 334, 336 may be generally aligned such that a common straight, axial centerline extends through apertures 334, 336.

As illustrated in FIGS. 2 and 3, second female hinge element 332 is spaced apart from first female hinge element 330 in the transverse direction T to define a space 338 between female hinge elements 330, 332. Space 338 is configured to complement the shape of male hinge element 326 such that when a male hinge element 326 of an identically or substantially similarly configured link 300 is received in space 338, aperture 328 of male hinge element 326 of the identically configured link is coincident with both apertures 334, 336 of female hinge elements 330, 332 that define space 338. Thus, the common axial centerline of apertures 334, 336 may extend through aperture 328.

Additionally, each side 308 of body 306 defines a respective siderail 340 that elongates or extends along the longitudinal direction L. Each siderail 340 includes an upper surface 342 disposed between bottom surface 316 and top surface 310 of body 306. Further, each siderail 340 includes an outer surface 344, and the outer surface 344 of one siderail 340 is spaced apart along the transverse direction T from outer surface 344 of the other siderail 340 to define a width $w_{link}$ of link 300.

Upper surface 342 of siderail 340 includes a pin-guiding surface 346 defined next to an outer end 348 of apertures 334, 336, i.e., outer end 348 of the respective nearer female hinge element 330, 332. Each respective pin-guiding surface 346 is shaped coincidentally with the respective aperture 334, 336 of the respective nearer female hinge element 330, 332. That is, pin-guiding surface 346 defined next to outer end 348 of aperture 334 of first female hinge element 330 is shaped coincidentally with aperture 334, and pin-guiding surface 346 defined next to outer end 348 of aperture 336 of second female hinge element 332 is shaped coincidentally with aperture 336.

Referring particularly to FIG. 2, to form chain 200, the male hinge element 326 of one link 300 fits into space 338 defined between first and second female hinge elements 334, 336 of an adjacent, identically-configured link 300 such that apertures 328, 334, and 336 are aligned for receipt of a pin 202. Pin 202 joins or holds together the adjacent links 300. Pin 202, apertures 328, 334, 336 and/or male hinge element 326, first female hinge element 330, and second female hinge element 332 may have any suitable configuration or feature(s) to secure pin 202 within the apertures and thereby join links 300.

In one exemplary embodiment of chain 200, the male portion 320 of one link 300 vertically overlies first and second female hinge elements 334, 336 of an adjacent link 300 such that the male portion 320 aligns with the complementary-shaped female portion 322 of the adjacent link 300. In some embodiments, such as the exemplary embodiment illustrated in FIG. 2, male portion 320 of one link 300 does not contact female portion 322 of an adjacent, identically-configured link 300, i.e., a space 204 may be defined between male portion 320 of the one link and female portion 322 of the adjacent link. However, the fit between pin 202 and aperture 328 of male hinge element 326 may be somewhat loose such that male hinge element has a limited range of motion within space 338 between first and second hinge elements 334, 336 of the adjacent link 300. Thus, space 204 may not have a defined length between male portion 320 and female portion 322 of adjacent links but may have a range of lengths based on the amount of movement or "play" male hinge element 326 has within space 338. Further, as one link 300 moves with respect to an adjacent link 300, horn segments 324 help prevent a user's finger, hand, or clothing from being caught or pinched between any two connected links. In other embodiments, male portion 320 of one link 300 may abut female portion 322 of an adjacent link 300 such that no space 204 is provided between top surface 310 of the one link and top surface 310 of the adjacent link. Additionally, the fit or spacing between the plurality of links 300 forming chain 200 may be the same for every pair of adjacent links 300 or may vary between adjacent link pairs.

Although described herein with respect to the particular link 300 illustrated in FIGS. 2, 3, and 4, it will be appreciated that the present subject matter may be applied to any suitable link configuration and any suitable chain formed from such links. That is, the chain 200 for conveying items thereon need not comprise links 300 having the configuration as illustrated in FIGS. 2, 3, and 4, but may comprise links having a configuration for forming a desired chain.

Turning now to FIGS. 5 through 10, a split fluid jet head and a manifold forming a cleaning assembly for cleaning the conveyor system 100, chain 200, and/or links 300 will be described. FIG. 5A provides a side view, FIG. 5B provides a top view, and FIG. 5C provides a bottom view of a split fluid jet head 400 according to an exemplary embodiment of the present subject matter. FIGS. 6 through 9 provide various views of a manifold 450 and the split fluid jet head 400 held in place with respect to the manifold 450, according to exemplary embodiments of the present subject matter.

Figure 5A:
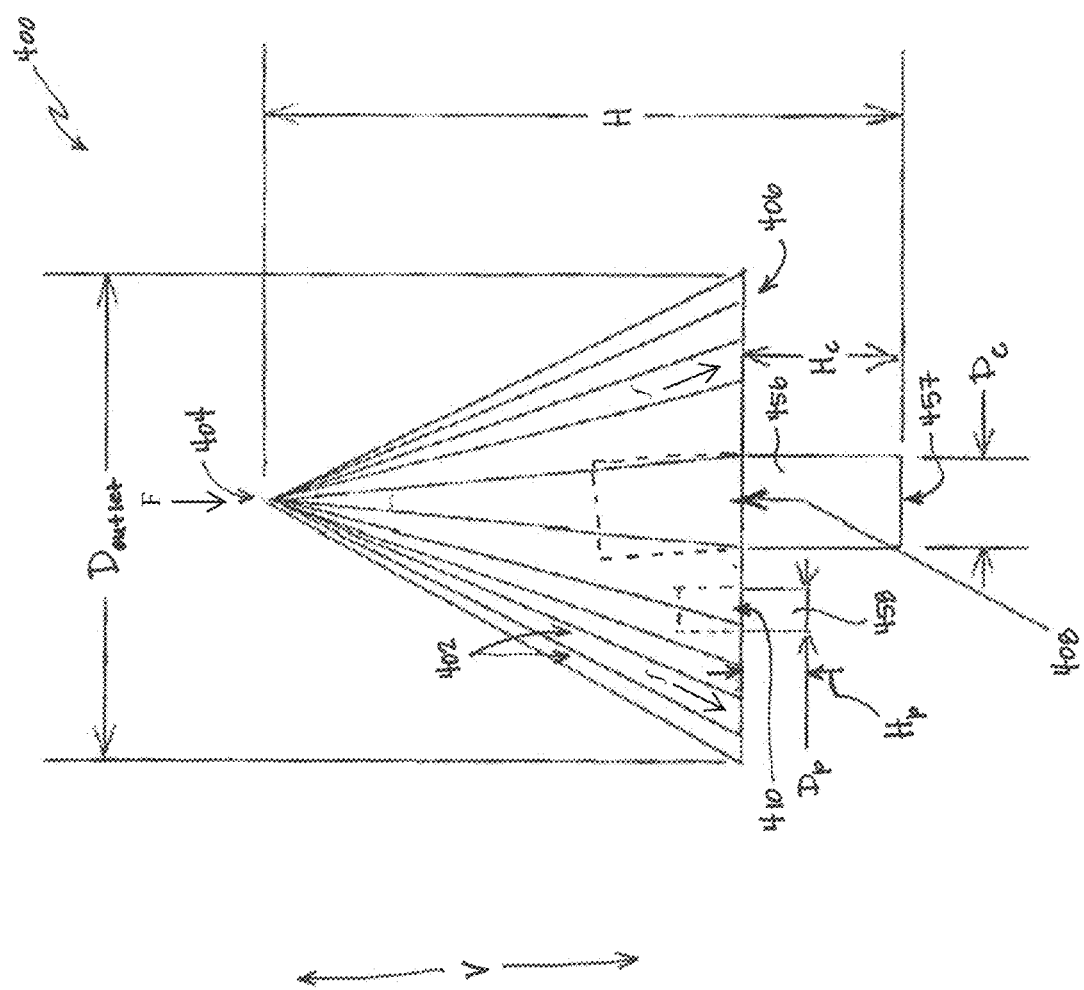
FIG. 5A provides a side view, FIG. 5B provides a top view, and FIG. 5C provides a bottom view of a split fluid jet head according to an exemplary embodiment of the present subject matter.
Figure 5C:
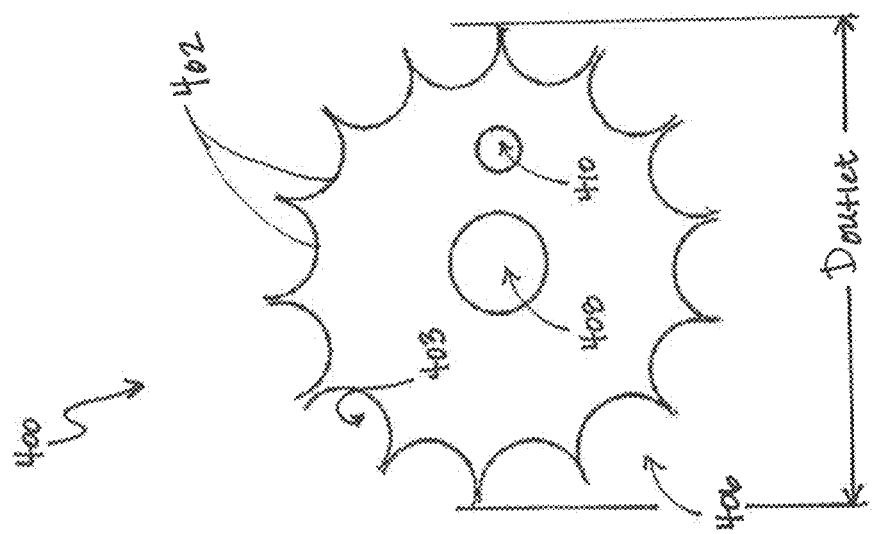
Figure 5B:
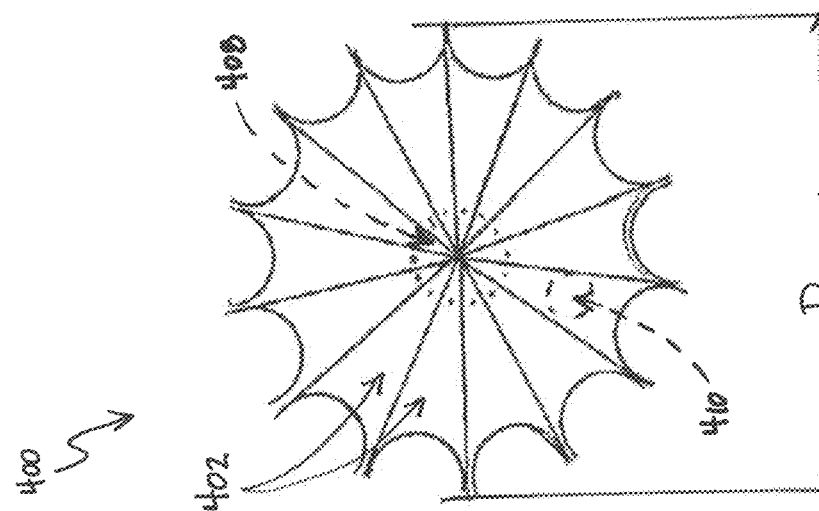

As shown in FIGS. 5A, 5B, and 5C, the split fluid jet head 400 comprises a plurality of veins or grooves 402 extending from an inlet end 404 to an outlet end 406 of the head 400.

The veins 402 split a flow of fluid F received at an inlet end 404 of the head 400 into a plurality of flows f. In some embodiments, the fluid F may be a cleaning fluid, such that the split fluid jet head 400 also may be referred to as a split jet head 400.

Each flow f of fluid from a vein 402 is directed to an inlet port in the manifold 450, as described in greater detail below. The pressure of the fluid F is equalized between the plurality of veins 402, i.e., each flow f of the fluid F provided to a vein 402 has substantially the same fluid pressure as the flow f of fluid F provided to another vein 402, such that substantially the same fluid pressure is delivered to each port in the manifold 450. From the manifold inlet ports, the manifold 450 directs the fluid flows f to various locations of the conveyor system 100, e.g., to clean the system 100.

The fluid F, split into a plurality of flows f by the veins 402, exits the head 400 at the outlet end 406. That is, the inlet end 404 of the head 400 receives the fluid F as a single flow or stream, and the outlet end 406 permits an egress of the fluid F from the head 400 as a plurality of flows f. As most clearly shown in the bottom view of FIG. 5C, each vein 402 has a generally semi-circular shape at the outlet end 406. The semi-circular outlets 403 of the veins 402 are arranged in a generally circular shape having a diameter $D_{outlet}$, i.e., in the depicted embodiment, the outlet end 406 of the split fluid jet head 400 has a diameter $D_{outlet}$. The diameter $D_{outlet}$ may be within a range of about one-half of one inch (0.5 in.) to about one inch (1 in.), and preferably may be about three-quarters of one inch (0.75 in.). In other embodiments, the outlet end 403 of each vein 402 may have another suitable shape, such as a full or complete circle, a polygonal shape, or a portion of a polygonal shape, and the outlet end 406 of the head 400 may be configured other than in a generally circular shape.

FIG. 6 provides a top view of the manifold 450, with an enlarged view of the manifold inlet ports, according to an exemplary embodiment of the present subject matter. As illustrated in FIG. 6, the exemplary manifold 450 is configured as a link of the mechanical chain 200. That is, the manifold 450 has generally the same shape as the link 300 illustrated in FIGS. 3 and 4, such that the manifold 450 may be described as a manifold link and may be assembled with links 300 to form chain 200 as shown in FIG. 2. That is, the manifold 450 may be part of the chain 200.

A plurality of inlet ports 452 are defined in the center of the top surface 310 of the manifold link 450. The plurality of inlet ports 452 are arranged side-by-side in a generally circular configuration and provide fluid communication between the split fluid jet head 400 and a plurality of fluid passages 454, illustrated in FIG. 7, defined throughout the manifold 450. In various embodiments, the manifold 450 comprises eleven (11), thirteen (13), or seventeen (17) inlet ports 452, but in other embodiments, the manifold 450 may comprise any suitable number of inlet ports 452. Referring particularly to FIG. 7, each inlet port 452 defines an opening to a fluid passage 454 through the manifold 450. As such, the manifold 450 comprises the same number of fluid passages 454 as inlet ports 452. Any suitable number of fluid passages 454 and associated inlet ports 452 for delivering a fluid F, e.g., to a particular configuration of conveyor system 100 or to provide a desired level or amount of cleaning, may be defined in the manifold 450. In some exemplary embodiments, the manifold 450 defines at least three fluid passages 454 (and thus, at least three inlet ports 452), but the manifold may define any appropriate number of fluid passages 454 to deliver fluid to desired locations, at a desired pressure, etc.

Further, a manifold 450 with a fewer number of inlet ports 452 may comprise inlet ports 452 of a larger diameter, e.g., the inlet ports 452 of a manifold including eleven (11) inlet ports have a larger diameter than the inlet ports 452 of a manifold 450 including seventeen (17) inlet ports. However, in other embodiments, the inlet ports 452 may have any suitable diameter, such that the inlet ports 452 of one manifold 450 have the same diameter, a smaller diameter, or a larger diameter than the inlet ports 452 of another manifold 450. Moreover, the plurality of inlet ports 452 of a manifold 450 may each have the same diameter, or the diameter of the inlet ports 452 may vary among the plurality of inlet ports 452 of a manifold 450.

FIG. 7 illustrates a portion of the manifold 450 with the veins 402 of split fluid jet head 400 aligned with the inlet ports 452 of manifold 450 and the head 400 held in position with respect to the manifold 450, such that the head 400 and manifold 450 are assembled as a cleaning assembly 420. More particularly, the manifold 450 includes a centering pin 456 and a positioning pin 458. The centering pin 456 centers the split fluid jet head 400 with respect to the manifold 450, e.g., to properly align each vein 402 with an inlet port 452 in the manifold 450, and the positioning pin 458 helps further align the head 400 with the manifold 450. Moreover, the pins 456, 458 help hold the head 400 in position with respect to the manifold 450.

Further, referring to FIG. 5A, the centering pin 456 may be generally cylindrical in shape and have a diameter $D_C$. The diameter $D_C$ may be within a range of about one eighth of one inch (0.125 in.) to about three eighths of one inch (0.375 in.). In particular embodiments, the diameter $D_C$ may be about one quarter of one inch (0.25 in.). Moreover, the centering pin 456 may have a height $H_C$ within a range of about one quarter of one inch (0.25 in.) to about three quarters of one inch (0.75 in.); preferably, the height $H_C$ is about three eighths of one inch (0.375 in.). Similarly, the positioning pin 458 may be generally cylindrical in shape and have a diameter D. The diameter $D_P$ may be within a range of about one sixteenth of one inch (0.0625 in.) to about one quarter of one inch (0.25 in.). In particular embodiments, the diameter $D_P$ may be about one eighth of one inch (0.125 in.). Additionally, the positioning pin 458 may have a height Hp within a range of about one eighth of one inch (0.125 in.) to about three eighths of one inch (0.375 in.); preferably, the height Hp is about one quarter of one inch (0.25 in.).

As further illustrated in FIGS. 5A, 5B, and 5C, the split fluid jet head 400 also includes features for aligning with and holding its position with respect to the manifold 450. For instance, the head 400 includes a centering pin aperture 408 and a positioning pin aperture 410. FIG. 5A depicts the centering pin aperture 408 and the positioning pin aperture 410 aligned with but not yet in receipt of the centering pin 456 and positioning pin 458, respectively. In FIG. 5A, the outlet end 406 of the head 400 is positioned in line with a top of the pins 456, 458, defining a height H from the inlet end 404 of the head 400 to a bottom 457 of the centering pin 456. It will be appreciated that, when the head 400 is lowered, the centering pin aperture 408 receives the centering pin 456, and the positioning pin aperture 410 receives the positioning pin 458. As shown, the veins 402 are arranged in a symmetrical configuration and the inlet ports 452 are arranged in a complementary configuration to the veins. The centering pin 456 extends between the split fluid jet head 400 and the manifold 450 generally at a center of the veins 402 and a center of the inlet ports 452 to center the split fluid jet head with respect to the inlet ports. The positioning pin 458 extends between the split fluid jet head 400 and the manifold 450 off-center of the center of the veins 402 and the center of the inlet ports 452.

Thus, the split fluid jet head 400 aligns with and is held in place with respect to the manifold 450 via the centering pin 456 and positioning pin 458. The centering pin and positioning pin apertures 408, 410 may be complementary in shape and size to the centering pin 456 and positioning pin 458 such that the pins 456, 458 fit snugly within the apertures 408, 410. For example, the centering pin aperture 408 may be generally cylindrical in shape, with a diameter and height substantially equal to the diameter $D_C$ and height $H_C$ of the centering pin 456. Of course, the centering pin and positioning pin apertures 408, 410 may be slightly larger than the centering pin and positioning pin 456, 458 to allow the split fluid jet head 400 to more easily be positioned on and removed from the pins 456, 458. In other embodiments, the head 400 may have an interference fit with either or both of the pins 456, 458, e.g., to ensure the head 400 does not deviate from its position with respect to the manifold 450 during use.

It will be appreciated that the split fluid jet head 400 includes the same number of veins 402 as inlet ports 452 of the manifold 450 with which the head 400 aligns. That is, as illustrated in FIG. 7, each vein 402 aligns with an inlet port 452 such that one vein 402 of the head 400 is in fluid communication with one inlet port 452 of the manifold 450. The inlet ports 452 thus place the fluid passages 454 in fluid communication with the veins 402 such that each fluid passage 454 receives a flow f of the fluid F from the outlet end 406 of the head 400. As previously described, the head 400 splits the fluid F into a plurality of flows f such that the pressure of the fluid F is equalized among the veins 402, i.e., each fluid passage 454 receives a flow f of fluid F at substantially the same pressure as the other fluid passages 454.

Figure 8C:
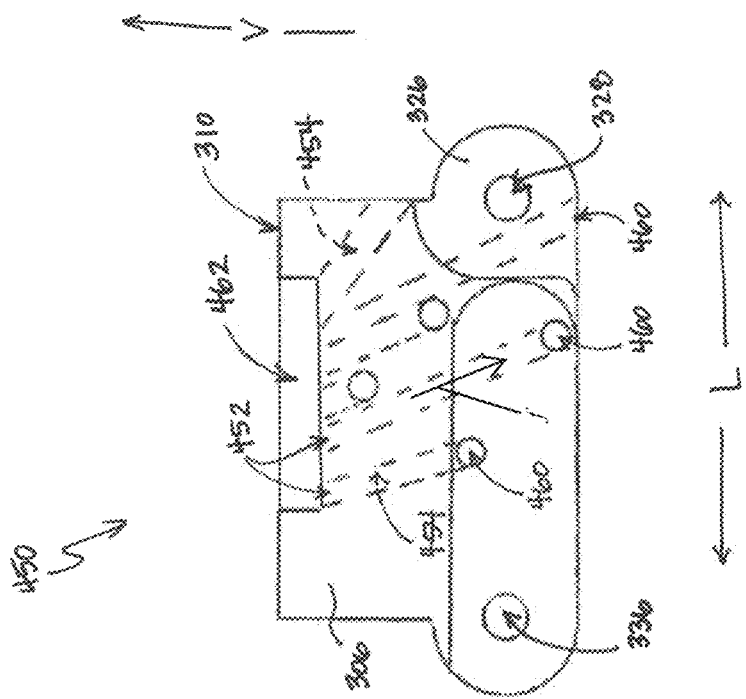
FIG. 8A provides a top view, FIG. 8B provides a front view, and FIG. 8C provides a side view of a manifold having seventeen (17) inlet ports according to an exemplary embodiment of the present subject matter.
Figure 8B:
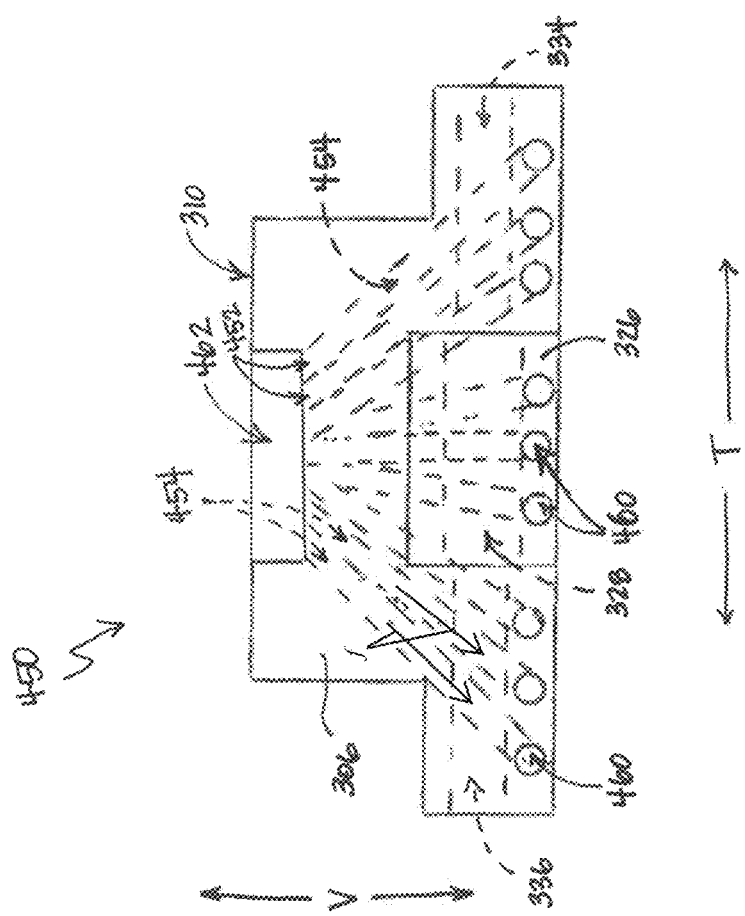

FIGS. 8A, 8B, and 8C illustrate one exemplary embodiment of a manifold link 450, in which the manifold link 450 comprises seventeen (17) inlet ports 452. FIG. 8A provides a top view, FIG. 8B provides a front view, and FIG. 8C provides a side view of the exemplary manifold 450. As depicted, the fluid passages 454 extend to various locations of the manifold link 450. Referring particularly to FIGS. 8B and 8C, the manifold 450 defines an outlet port 460 for each fluid passage 454, thereby defining seventeen (17) outlet ports 460 at various locations along the body 306 of the manifold link 450. As such, each fluid passage 454 of the plurality of fluid passages 454 of the manifold 450 comprises an inlet port 452 and an outlet port 460. Further, as shown in FIGS. 8A, 8B, and 8C, the outlet ports 460 are defined along the leading end 302 and each opposing side 308 of the manifold link 450. A portion of the outlet ports 460 also are defined along the bottom surface 316 of the manifold link 450. The flow f of the fluid F delivered to fluid passages 454 thus exits the manifold 450 through each outlet port 460, and because the outlet ports 460 are defined at a plurality of different locations over the body 306 of manifold link 450, the fluid F is directed to a plurality of locations within the conveyor system 100. For example, the fluid F may exit the outlet ports 460 defined along the bottom surface 316 at a sufficient pressure to break up or loosen any debris adjacent the outlet ports 460. The outlet ports 460 defined along other portions of the body 306 of manifold link 450 may be defined at specific locations to help break up or loosen any debris adjacent those ports 460, as well as force out the debris loosened by the bottom surface outlet ports 460.

FIGS. 9A, 9B, and 9C illustrate another exemplary embodiment of a manifold link 450, in which the manifold link 450 comprises eleven (11) inlet ports 452. FIG. 9A provides a top view, FIG. 9B provides a front view, and FIG. 9C provides a side view of the exemplary manifold 450. Like the embodiment illustrated in FIGS. 8A, 8B, and 8C, the exemplary manifold 450 illustrated in FIGS. 9A, 9B, and 9C has a plurality of fluid passages 454 that each include an inlet port 452 and an outlet port 460. Thus, the manifold link 450 defines eleven (11) outlet ports 460 at various locations along the body 306 of the manifold link 450. More specifically, as shown in FIGS. 9A, 9B, and 9C, the outlet ports 460 are defined along the leading end 302 and each opposing side 308 of the manifold link 450. A portion of the outlet ports 460 also are defined along the bottom surface 316 of the manifold link 450. The flow f of the fluid F delivered to fluid passages 454 thus exits the manifold 450 through each outlet port 460, and because the outlet ports 460 are defined at a plurality of different locations over the body 306 of manifold link 450, the fluid F is directed to a plurality of locations within the conveyor system 100. For instance, as previously described the fluid F may exit the outlet ports 460 defined along the bottom surface 316 at a sufficient pressure to break up or loosen any debris adjacent the outlet ports 460. The outlet ports 460 defined along other portions of the body 306 of manifold link 450 may be defined at specific locations to help break up or loosen any debris adjacent those ports 460, as well as force out the debris loosened by the bottom surface outlet ports 460.

As most clearly illustrated in FIGS. 8B, 8C, 9B, and 9C, the inlet ports 452 of each manifold link 450 are recessed. More particularly, a port recess 462 is defined in the top surface 310 of each manifold link 450. The port recess 462 receives the split fluid jet head 400 such that the head 400 is received within the port recess 462. As previously described, each manifold link 450 also includes a centering pin 456 and a positioning pin 458, which are received within a centering pin aperture 408 and a positioning pin aperture 410, respectively, of the head 400. Therefore, when properly aligned with the manifold link 450 such that the pins 456, 458 are received within apertures 408, 410, the head 400 is attached to or coupled with the manifold link 450. Such attachment or coupling helps, for example, prevent the force or pressure of the fluid F from separating the split fluid jet head veins 402 from the manifold inlet ports 452 as the flows f of fluid F are delivered to the inlet ports 452 through the veins 402.

Figure 10:
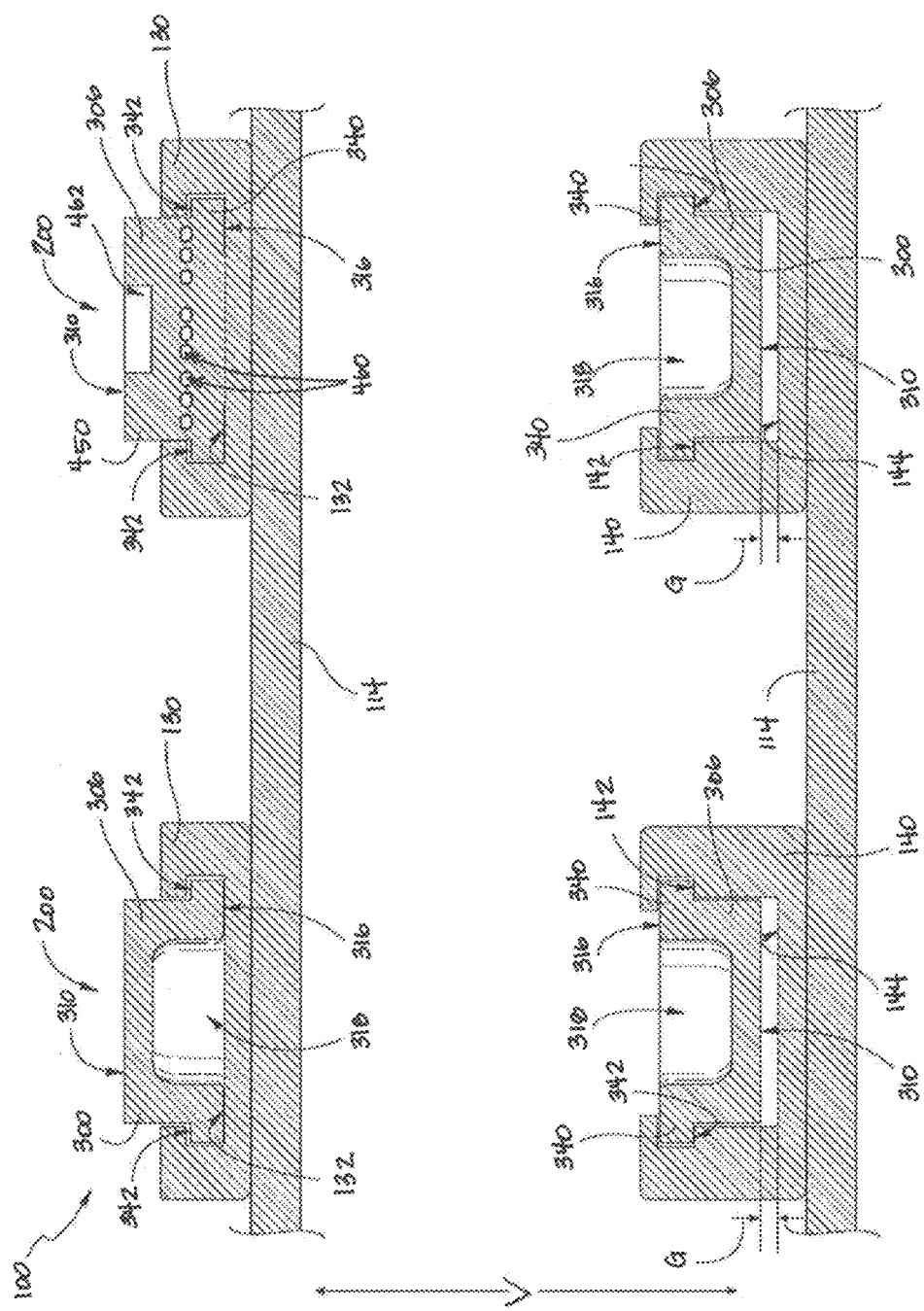
FIG. 10 provides a schematic, widthwise cross-section view of the conveyor system of FIG. 1 according to an exemplary embodiment of the present subject matter.

Comparing FIGS. 8A, 8B, and 8C with FIGS. 9A, 9B, and 9C, in various embodiments of the manifold link 450, the fluid passages 454 and outlet ports 460 may be defined at different locations within and along the body 306 of the manifold link 450. Therefore, in some embodiments of conveyor system 100, more than one configuration of manifold link 450 may be used to provide the fluid F to the conveyor system 100, e.g., to provide the fluid F to different areas of the system. For instance, the chain 200 may be supported within an upper profile or track 130 and a lower profile or track 140, as illustrated in FIG. 10, which provides a widthwise cross-section view of a portion of conveyor system 100. As shown in FIG. 10, a portion of chain 200 is received within an upper profile or track 130 as chain 200 traverses a path 104 (FIG. 1) from the return end 108 toward the drive end 106 of conveyor system 100. More specifically, the bottom surface 316 of each link 300 and manifold link 450 of the portion of chain 200 received within upper profile 130 slides along an upper sliding surface 132 toward the sprocket assembly 120 positioned at drive end 106 (FIG. 1).

That is, the top surface 310 of each link 300 received within upper profile 130 faces upward along the vertical direction V. Further, the top surface 310 of each link 300 received within upper profile 130 projects above upper profile 130 along the vertical direction V such that, e.g., items placed on a chain 200 to be conveyed from one location to another by conveyor system 100 and/or a split fluid jet head 400 to be aligned with and attached to a manifold link 450, are not impeded by upper profile 130.

As the links 300, 450 of chain 200 traverse the path 104 of the chain 200 from the drive end 106 toward the return end 108 of conveyor system 100, as depicted in FIG. 1, a portion of chain 200 is received within a lower profile 140, as shown in FIG. 10. The upper surface 342 of link siderails 340 of the portion of chain 200 received within lower profile 140 slides along a lower sliding surface 142 of the lower profile 140 as the chain 200 traverses the path 104 from drive end 106 toward return end 108. That is, the top surface 310 of each link 300, 450 received within the lower profile 140 faces downward along the vertical direction V and in opposition to an inner surface 144. In addition, the lower sliding surface 142 is defined at a vertical distance above the inner surface 144 of the lower profile 140 such that a gap G is defined between the inner surface 144 and the top surface 310 of links 300, 450 within the lower profile 140. By spacing top surface 310 of links 300, 450 forming chain 200 from the inner surface 144, such that top surface 310 does not slide along the inner surface 144, wear of top surface 310 of links 300, 450 can be avoided or reduced.

As illustrated in FIG. 10, the upper profile 130 has various surfaces that support and/or are adjacent the chain 200, with various angles defined between the different surfaces. In some embodiments, the chain 200 may comprise at least two manifold links 450 that are configured differently from one another, e.g., with outlet ports 460 defined at different locations on the body 306 of one manifold link 450 than on the body 306 of the other manifold link 450. Thus, the different configurations of manifold links 450 may be used to provide flows f of fluid F to different surfaces and angles of the profile 130, e.g., to better clean the profile. In other embodiments, the chain 200 may include only one manifold link 450 or a plurality of manifold links 450 having the same configuration. Preferably, the chain includes at least three manifold links 450, and each manifold link 450 may be identically configured or at least two manifold links may be differently configured. As previously described, no matter the configuration of each manifold link 450, the fluid F may exit some outlet ports 460 to break up or loosen debris on certain surfaces, while the remainder of the outlet ports 460 are defined at specific locations along the body 306 of a manifold 450 in order to force the loosened debris out of the profile 130.

Thus, a split fluid jet head 400 may be aligned with and attached to a manifold link 450 as described herein, e.g., to provide a cleaning fluid F to the manifold link 450 to clean one or more portions of a conveyor system 100. For example, the manifold link 450 is included as a link of a chain 200 of the system 100, and the fluid F is split into a plurality of flows f by the head 400 to provide the cleaning fluid F to various surfaces and angles of a profile 130 through which a chain 200 moves within the system 100. The fluid F also may be used to clean links 300 of the chain 200. It will be appreciated that the fluid F may be any suitable fluid for cleaning within the conveyor system 100, such as water, a mixture of water and one or more cleaning agents or chemicals, pressurized air, or the like. It should also be understood that the subject matter described herein may have other uses as well. For instance, fluids F other than cleaning fluids may be provided through the split jet head 400, which may be coupled to a manifold 450 configured other than as a link of a conveyor chain 200. As one example, the split jet head 400 may be used to provide a plurality of flows f of a beverage to a manifold 450, e.g., for creating mixed drinks or the like. As another example, the split jet head 400 may be used to provide a plurality of flows f of a fluid F, such as a fertilizer, water, or the like, to a manifold 450 of an agricultural implement. Other uses of the split jet head 400 and manifold 450 also may occur to those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A cleaning assembly, comprising:
   a manifold including a body and a plurality of fluid passages defined through the body, each fluid passage having an inlet port and an outlet port such that the manifold has a plurality of inlet ports and a plurality of outlet ports,
   wherein the plurality of outlet ports are defined at various locations along the body,
   wherein the manifold is configured in the shape of one of a plurality of links of a mechanical chain and is assembled with the plurality of links to form the mechanical chain,
   wherein the body of the manifold extends in a longitudinal direction between a leading end and a trailing end and defines a pair of opposing sides that extend in the longitudinal direction between the leading end and the trailing end, and
   wherein at least a portion of the outlet ports are defined along the leading end and each opposing side of the body.

2. The cleaning assembly of claim 1, wherein the manifold comprises at least eleven inlet ports.

3. The cleaning assembly of claim 1, wherein the body of the manifold comprises a bottom surface for sliding along a sliding surface of a conveyor assembly, and wherein a portion of the outlet ports are defined along the bottom surface of the body.

4. The cleaning assembly of claim 1, wherein the mechanical chain is assembled with an upper profile, a lower profile, and a support structure to form a conveyor system.

5. The cleaning assembly of claim 1, further comprising:
   a split fluid jet head including
      an inlet end for receipt of a flow of a fluid,
      an outlet end for an egress of the fluid, and
      a plurality of veins extending from the inlet end to the outlet end, the plurality of veins splitting the flow of the fluid into a plurality of flows of the fluid.

6. The cleaning assembly of claim 5, wherein the manifold is configured to receive the split fluid jet head such that each vein of the plurality of veins is aligned with an inlet port of the plurality of inlet ports.

7. A cleaning assembly, comprising:
a split fluid jet head including
an inlet end for receipt of a flow of a fluid,
an outlet end for an egress of the fluid, and
a plurality of veins extending from the inlet end to the outlet end, the plurality of veins splitting the flow of the fluid into a plurality of flows of the fluid; and
a manifold for receipt of the split fluid jet head, the manifold including a body and a plurality of fluid passages defined through the body, each fluid passage having an inlet port and an outlet port such that the manifold has a plurality of inlet ports and a plurality of outlet ports,
wherein the plurality of outlet ports are defined at various locations along the body, and
wherein the manifold is configured to receive the split fluid jet head such that each vein of the plurality of veins is aligned with an inlet port of the plurality of inlet ports.

8. The cleaning assembly of claim 7, wherein each vein of the plurality of veins has an outlet at the outlet end, and wherein each outlet has a semi-circular shape.

9. The cleaning assembly of claim 7, wherein each vein of the plurality of veins has an outlet at the outlet end, and wherein the outlets are arranged in a circular shape.

10. The cleaning assembly of claim 9, wherein the plurality of inlet ports are arranged side-by-side in a circular configuration.

11. The cleaning assembly of claim 7, wherein the veins are arranged in a symmetrical configuration and the inlet ports are arranged in a complementary configuration to the veins, and wherein a centering pin extends between the split fluid jet head and the manifold at a center of the veins and a center of the inlet ports to center the split fluid jet head with respect to the inlet ports.

12. The cleaning assembly of claim 11, further comprising:
a positioning pin extending between the split fluid jet head and the manifold off-center of the center of the veins and the center of the inlet ports.

13. The cleaning assembly of claim 12, wherein the manifold includes the centering pin and the positioning pin, and wherein the split fluid jet head defines a centering pin aperture for receipt of the centering pin and a positioning pin aperture for receipt of the positioning pin.

14. The cleaning assembly of claim 7, wherein the manifold is configured in the shape of one of a plurality of links of a mechanical chain and is assembled with the plurality of links to form the mechanical chain, and wherein the mechanical chain is assembled with an upper profile, a lower profile, and a support structure to form a conveyor system.

15. A conveyor system, comprising:
at least one chain having a plurality of links, the at least one chain configured for conveying items thereon;
an upper profile for receipt of a portion of the at least one chain;
a lower profile for receipt of another portion of the at least one chain;
a support structure for supporting the at least one chain, the upper profile, and the lower profile; and
a cleaning assembly including
a split fluid jet head including
an inlet end for receipt of a flow of a fluid,
an outlet end for an egress of the fluid, and
a plurality of veins extending from the inlet end to the outlet end, the plurality of veins splitting the flow of the fluid into a plurality of flows of the fluid, and
a manifold for receipt of the split fluid jet head, the manifold including a body and a plurality of fluid passages defined through the body, each fluid passage having an inlet port and an outlet port such that the manifold has a plurality of inlet ports and a plurality of outlet ports,
wherein the plurality of outlet ports are defined at various locations along the body,
wherein the manifold is configured to receive the split fluid jet head such that each vein of the plurality of veins is aligned with an inlet port of the plurality of inlet ports, and
wherein the manifold is configured in the shape of one of the plurality of links and is assembled with the plurality of links to form the mechanical chain.

16. The conveyor system of claim 15, wherein the manifold includes a top surface and defines a port recess in the top surface, and wherein the inlet ports are defined within the port recess such that the inlet ports are recessed with respect to the top surface and the split fluid jet head is received within the port recess.

17. The conveyor system of claim 15, wherein the conveyor system comprises more than one manifold, each manifold comprising a body and a plurality of fluid passages that each have an inlet port and an outlet port, and wherein a first manifold has a different configuration from a second manifold of the conveyor system such that the outlet ports of the first manifold are defined at different locations on its body than the outlet ports of the second manifold.

18. The conveyor system of claim 15, wherein the fluid is a cleaning fluid.

19. The conveyor system of claim 15, wherein the body of the manifold extends in a longitudinal direction between a leading end and a trailing end and defines a pair of opposing sides that extend in the longitudinal direction between the leading end and the trailing end, wherein the body extends in the vertical direction between a top surface and a bottom surface, wherein a first portion of the outlet ports are defined along the leading end and each opposing side of the body, and wherein a second portion of the outlet ports are defined along the bottom surface of the body.

* * * * *